United States Patent [19]

Rowe et al.

[11] Patent Number: 5,509,206
[45] Date of Patent: Apr. 23, 1996

[54] PORTABLE OR TABLE MOUNTED BAND SAW UTILIZING DUAL CUTTING PROCEDURE OF BAND SAW BLADE

[76] Inventors: Jack L. Rowe, P.O. Box 5281, Kingsport, Tenn. 37663; Donald M. Rowe, P.O. Box 543, Bedford, Va. 24523

[21] Appl. No.: 141,631

[22] Filed: Oct. 27, 1993

[51] Int. Cl.⁶ ............................. B23D 53/12; B27B 13/10
[52] U.S. Cl. ................................... 30/380; 83/820; 83/792
[58] Field of Search ........................ 30/380, 274, 123.3, 30/123.4; 83/820, 821, 792, 824, 825

[56] References Cited

U.S. PATENT DOCUMENTS

| | | | |
|---|---|---|---|
| 822,056 | 5/1906 | Knox | 83/792 |
| 1,374,638 | 4/1921 | De Cew et al. | 30/380 |
| 2,515,345 | 7/1950 | Hayes | 30/123.3 |
| 3,668,961 | 6/1972 | Blue | 30/380 |
| 3,961,468 | 6/1976 | Brown et al. | 30/380 |
| 4,001,937 | 1/1977 | Stelljes et al. | 30/380 |
| 4,179,966 | 12/1979 | Ginnow et al. | 83/820 |
| 4,193,192 | 3/1980 | Cortez | 30/380 |
| 4,258,763 | 3/1981 | Figueredo et al. | 30/380 |
| 4,677,887 | 7/1987 | Martin | 30/380 |
| 4,711,032 | 12/1989 | Rickmers et al. | 30/380 |
| 5,246,088 | 9/1993 | Imai et al. | 30/123.3 |

*Primary Examiner*—Hwei S. Payer

[57] ABSTRACT

An improved portable band saw having a unitary, rigid frame, a novel blade alignment, greatly increasing the depth of cut.

1 Claim, 6 Drawing Sheets

NEW ART

PORTABLE OR TABLE MOUNTED BAND SAW UTILIZING DUAL CUTTING PROCEDURE OF BAND SAW BLADE

BACKGROUND

1. Field of Invention

This invention relates to electric or gasoline powered saws, specifically, powered saws using band saw blades for sawing wood, metal, and performing a wide variety of other sawing functions.

2. Description of Prior Art

Heretofore, a wide variety of powered band saws have been proposed and implemented, but usage has been limited to work shop and industrial use. Due to bulk, heavy weight, and blade configuration, there did not exist, a safe, portable, lightweight, versatile, and multipurpose band saw which can be adapted to most residential, farm, and yard needs while providing the advantages of being safe, lightweight, and versatile for specialized industrial, commercial, and professional uses.

All previously designed band saws have consisted of a band saw blade revolving around two or more wheels with the depth of cut usually limited to less than the diameter of the drive or idler wheels of the particular tool. It was not obvious to all prior art applications of band saw usage that the setting of band saw blade teeth could be set to allow the blade to move and saw against itself within the cutting zone.

Many users, for the reasons set out above, would find it desirable to have a multipurpose tool which utilizes this application of the band saw blade and which does not possess the inherent dangers of the chain saw or the limitations of the conventional band saw design.

OBJECTS AND ADVANTAGES

Accordingly, we claim the following as the objects and advantages of our invention: To provide a tool for easily and reliably cutting wood in home work shops, industry, construction, tree trimming, surgical work, meat packing plants, and sawmills. A tool which can saw in a novel and heretofore unobvious manner, greatly increasing the application of band sawing, reducing the risk of personal injury, increasing portability, reducing energy consumed, reducing noise, and increasing production.

Readers will find further objects and advantages of the invention from a consideration of the ensuing description and accompanying informal drawings following hereafter.

BRIEF SUMMARY OF THE INVENTION

Heretofore, a wide variety of powered band saws have been proposed and implemented, but usage has been limited to work shop and industrial use. Due to bulk, heavy weight, and blade configuration, there did not exist, a safe, portable, lightweight, versatile, and multipurpose band saw which can be adapted to most residential, farm, and yard needs while providing the advantages of being safe, lightweight, and versatile for specialized industrial, commercial, and professional uses.

All previously designed band saws have consisted of a band saw blade revolving around two or more wheels with the depth of cut usually limited to less than the diameter of the drive or idler wheels of the particular tool. It was not obvious to all prior art applications of band saw usage that the setting of band saw blade teeth could be set to allow the blade to move and saw against itself within the cutting zone, Many users, for the reasons set out above, would find it desirable to have a multipurpose tool which utilizes this application of the band saw blade and which does not possess the inherent dangers of the chain saw or the limitations of the conventional band saw design.

This saw includes a bow or frame with attached power source, and idle wheel mounted on one end of the bow and a power drive wheel attached to power source at opposite or drive wheel end of bow, a saw band running over the wheels with a portion running between guide roller assemblies which define a cutting zone and brings and holds the blade against itself as it passes through this zone, giving the tool its novel and non obvious alignment of blade.

BRIEF DESCRIPTION OF THE DRAWINGS

FIG. 6 (B) shows novel and non obvious setting of blade teeth for this tool.

DETAILED DESCRIPTION OF THE INVENTION

This band saw includes generally a bow or frame with attached power source, an idle wheel mounted on one end of the bow and a power drive wheel attached to power source at opposite or drive wheel end of bow, a saw band running over the wheels with a portion running between guide roller assemblies which define a cutting zone and brings and holds the blade against itself as it passes thru this zone, giving the tool its novel and non obvious alignment of blade.

Figure 1:
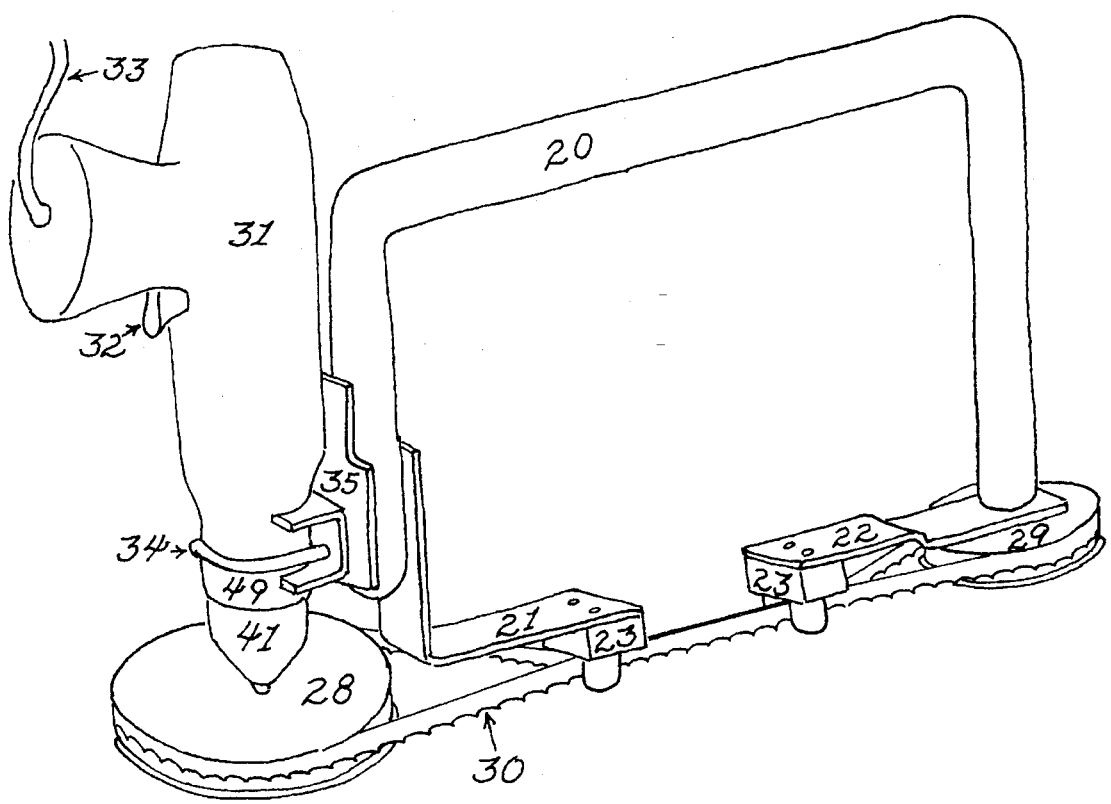
FIG. 1 shows a perspective view of tool.

FIG. 1 is a perspective of a portable band saw consisting of a bow 20 having mounted on it a variable speed drill 31, a drive wheel 28 and an idle wheel 29, and guide roller assemblies 23 for aligning and placing tension on band saw blade 30. Connected in driving relationship to the variable speed drill 31 is the drive wheel 28. Power is supplied through cord 33 and the trigger 32 to variable speed drill 31. The power control means and the variable speed drill 31 are conventional elements which may be varied. All these combinations are well known and in constant use, and it is to be understood that the different requirements for the differing work for which the tool is intended will dictate these elements.

Variable speed drill 31 is mounted to bow 20 by bolt 34 encircling neck 49 of drill 31. Attachment plate 35 is connected to U-bolt 34 by inserting ends of U-bolt 34 through holes 47 in attachment plate 35 and held secure by nuts 44. Attachment plate 35 is mounted to bow 20 by bolts 36 through holes 43 in bow 20, holes 48 in attachment plate 35 and secured by nuts 44. See FIG. 2.

Drive wheel 28 in The preferred embodiment FIG. 1 is a cast metal wheel with a resilient band 40 tightly encircling wheel 28 and providing frictional drive to blade 30; flanges 39 prevent blade from running off wheel 28, and the shaft 38 of drive wheel 28 is locked into chuck 41 of variable speed drill 31.

Turning now to idle wheel assembly 29. Idle wheel 29 is mounted onto stub shaft 37 of bow 20 and secured by nut 44. Idle wheel 29, FIG. 5, is similar in size and shape to drive wheel 28, having flanges 39 and resilient band 40.

Figure 5:
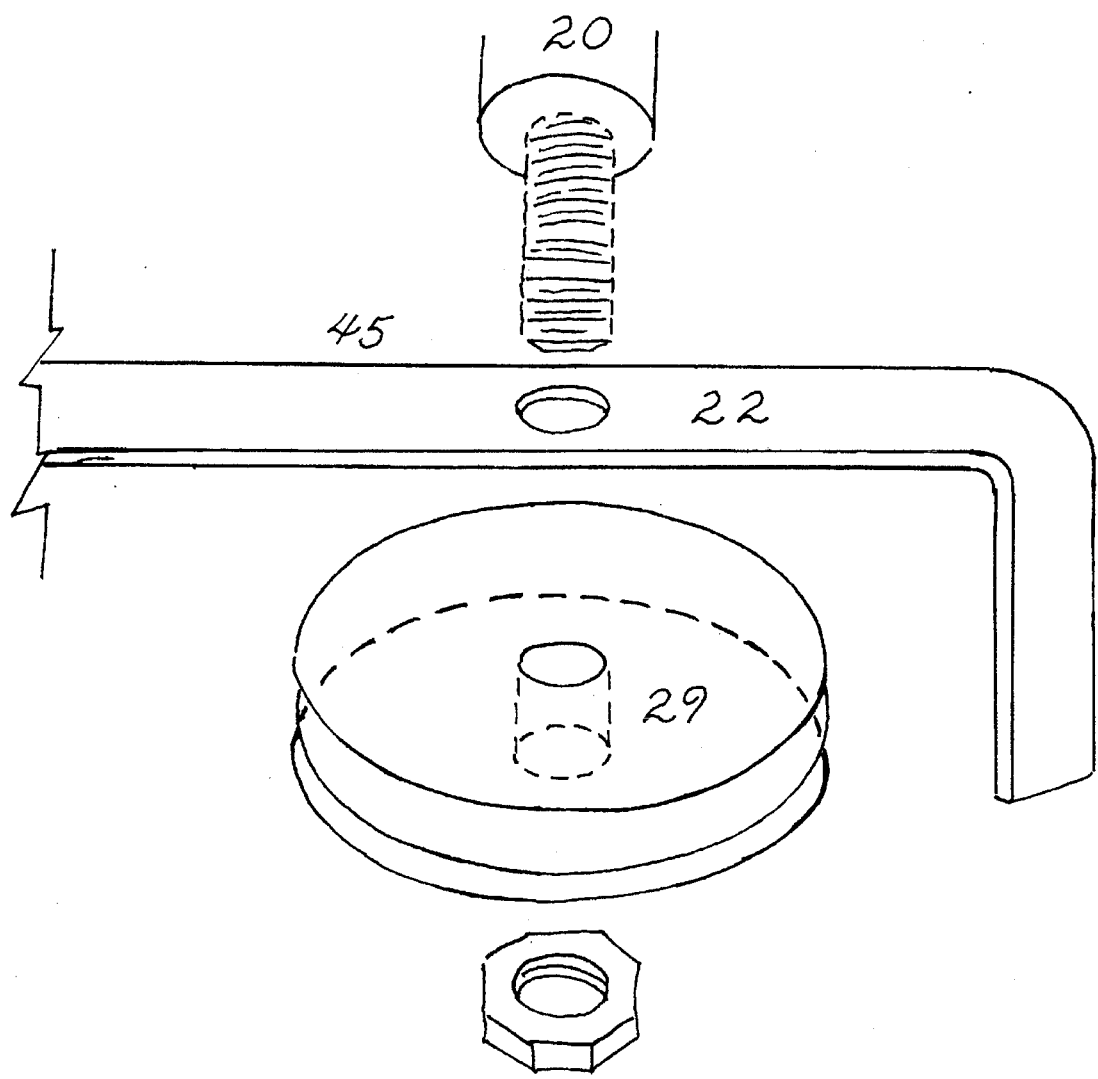
FIG. 5 shows Idle Wheel Assembly.

The path of the blade 30 from drive wheel 28 is indicated by arrows in FIG. 5. From drive wheel 28 blade 30 travels to and between guide rollers 24 and 25 to and between guide rollers 26 and 27. From there it goes to and around idle wheel 29 and back to and between guide rollers 26 and 27 where it moves against itself and in the opposite direction. The inside surface of blade 30 being pressed against itself from guide rollers 26 and 27 to and between guide rollers 24 and 25, and the path of blade between roller guides 26 and 27 and 24 and 25 where the blade is pressed against itself and traveling in opposite directions to itself is to be defined as the productive, dual cutting zone. The alignment of blade through this zone is novel and non obvious. After blade 30 continues to and between guide roller 24 and 25. It is now out of the defined productive cutting zone. Blade 30 diverges from itself, traveling again to and around drive wheel 28.

Figure 6A:
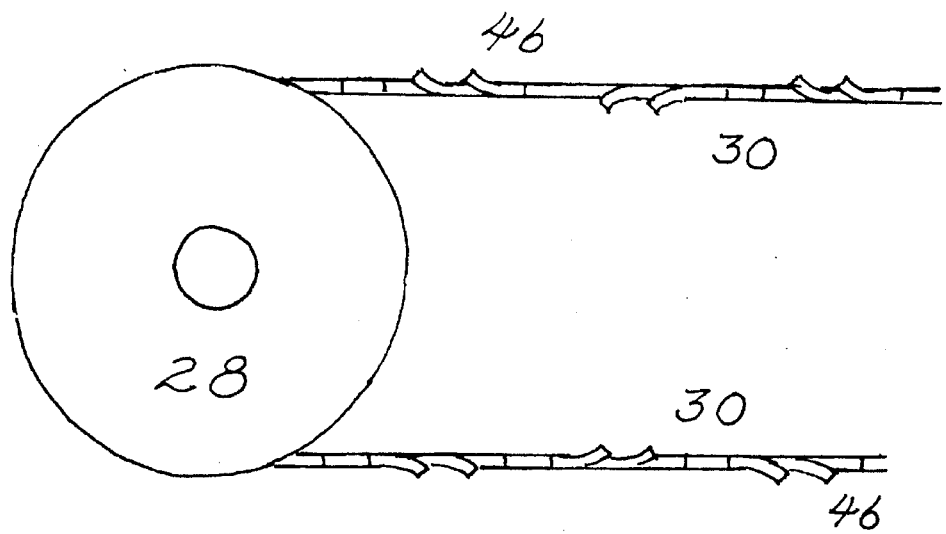
FIG. 6 (A) shows prior art band saw blade teeth setting.
Figure 6B:
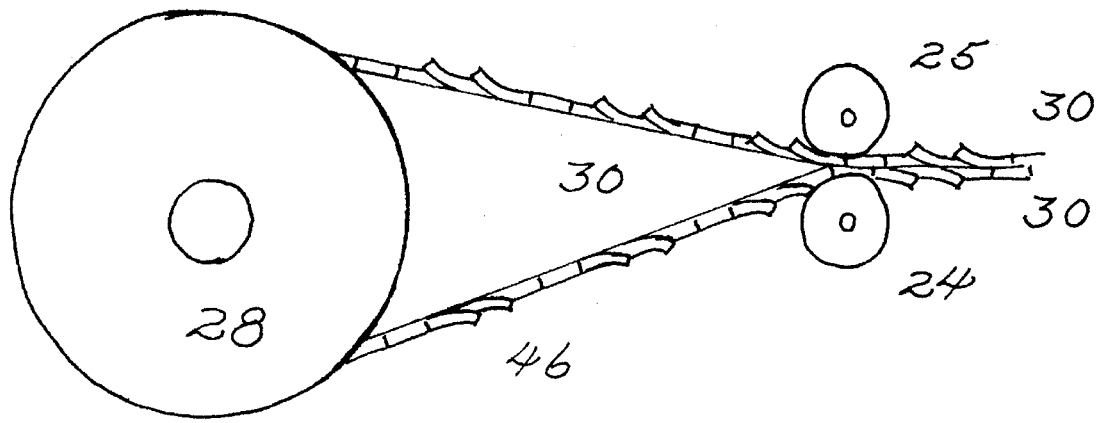

Setting of teeth 46 of blade 30 FIG. 6 is crucial to operation of tool. All teeth 46 of blade 30 must be straight or any combination of straight and outward set. None of the teeth 46 of blade 30 can be set inward which would prevent rotation of blade 30. Outward set of teeth 46 being defined as point of tooth or teeth 46 inclined at any angle away from axis of drive wheel 28 or idle wheel 29. Inward set of tooth or teeth 46 being defined as point of tooth or teeth 46 pointing in any angle toward axis of drive wheel 28 or idle wheel 29. Teeth 46 set straight being defined as teeth or tooth 46 pointed in a line parallel with axis of drive wheel 28 or idle wheel 29.

Figure 2:
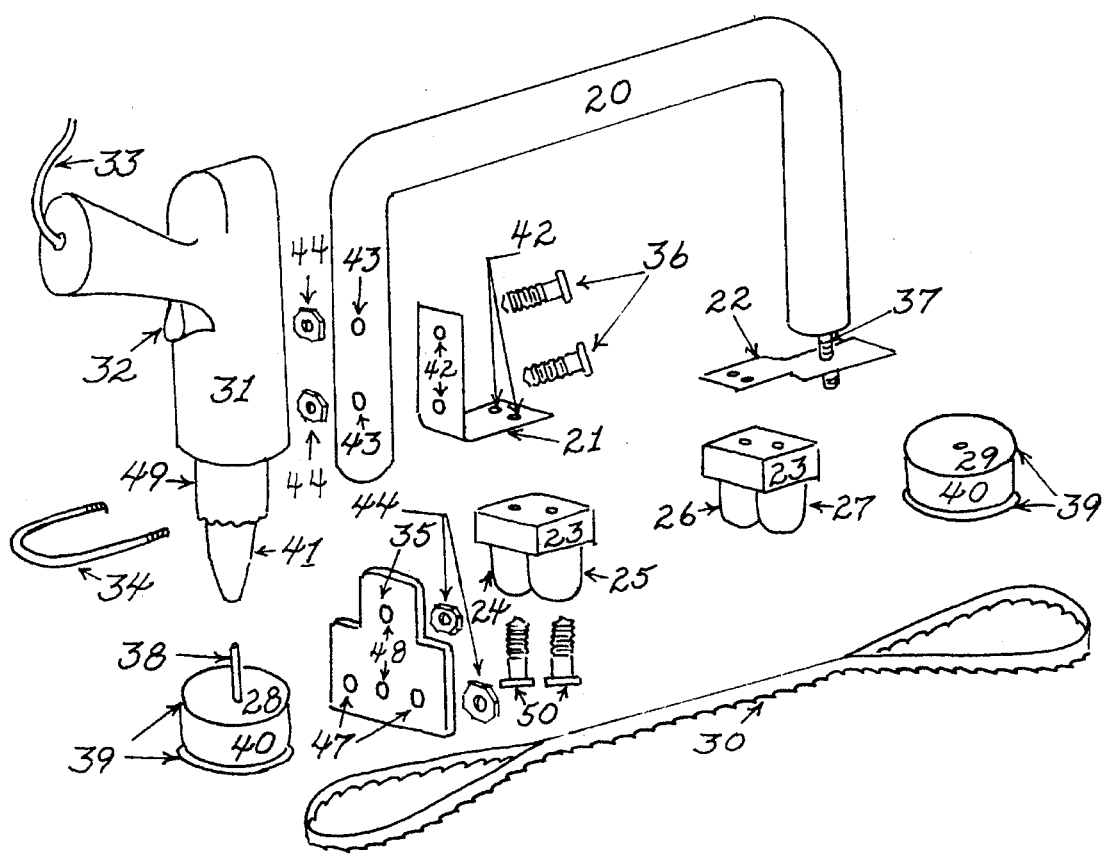
FIG. 2 shows a disassembled view of tool.
Figure 3:
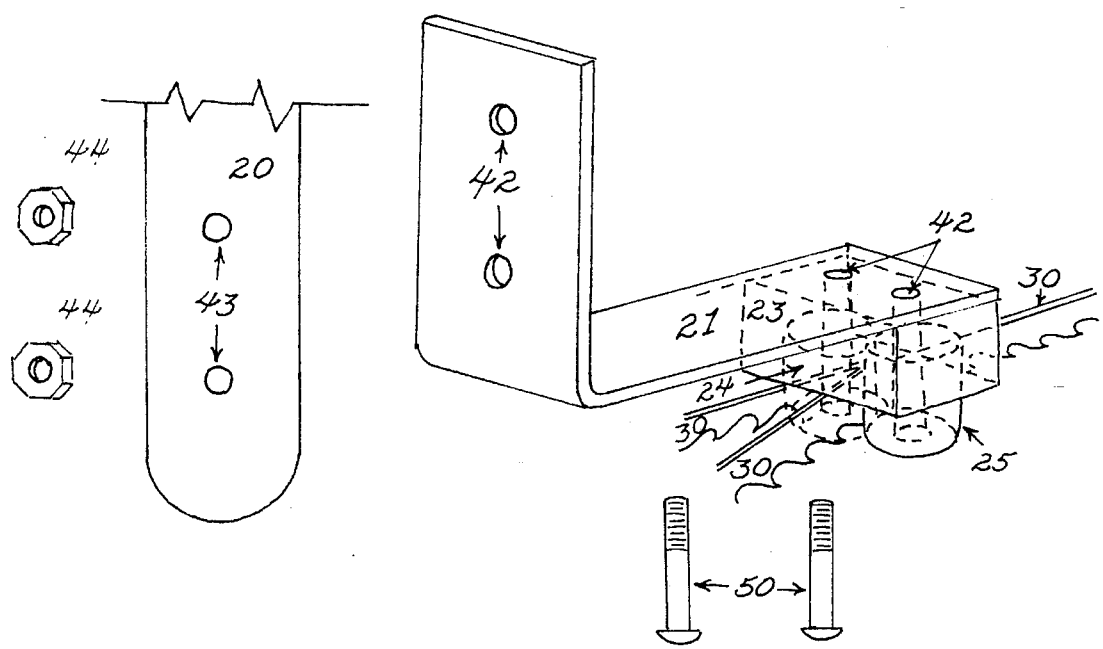
FIG. 3 shows alignment of blade through Guide Roller Assembly.
Figure 4:
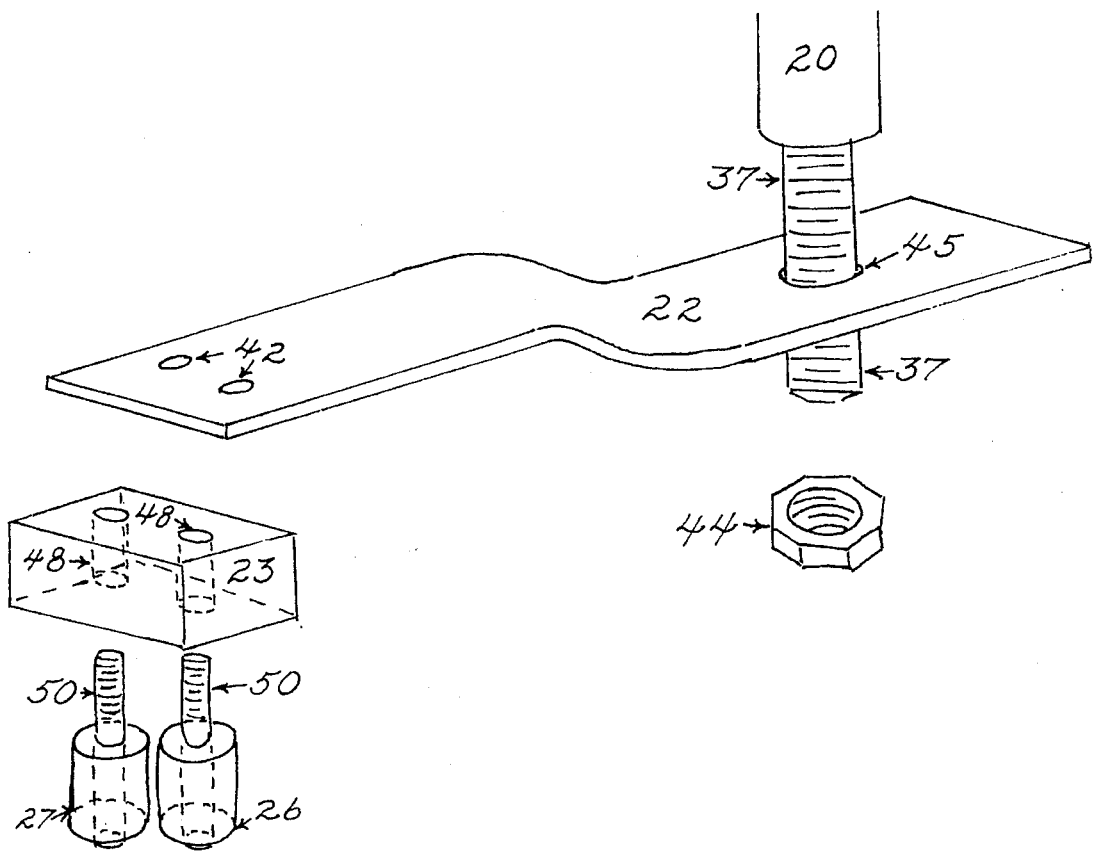
FIG. 4 shows disassembled view of guide roller assembly and guide roller assembly support bar.

Turning to guide roller assemblies 23, guide roller support bar 21 is mounted to bow 20 by inserting bolts 36 through holes 42 in guide roller support bar 21 and through holes 43 in bow 20 as shown in FIG. 2 and threading nuts 44 on to bolts 36. Guide roller assembly 23 is mounted to the other end of guide roller support bar 21 by means of bolts 50 inserted through holes 48 in guide roller assembly 23 and holes 42 in guide roller support bar 21. Guide rollers 24 and 25 are roller bearing type guide rollers and are mounted to the bottom of guide roller assembly 23 by means of threaded bolts 50 which are inserted through holes 42 in guide roller support bar 21. These bearing type guide rollers 24 and 25 and 26 and 27 are mounted on the bottom of guide roller block 23 parallel to each other and separated at a distance twice the thickness of the band saw blade 30 to hold the blade 30 in proper alignment. Guide roller assembly support bar 22 FIG. 4 is mounted to bow 20 at Idle wheel end of bow 20. This is done by inserting tub shaft 37 through hole 45 of support bar 22 before idle wheel 29 is attached. See FIG. 4.

In all other respects, guide roller assemblies 23 are mirror images of each other, therefore only one has been completely described herein.

Guide roller assemblies 23 reduce friction in rotation of blade 30 and provide novel, unique, and non obvious dual cutting alignment of blade 30.

We claim:

1. A motor operated hand-held band saw comprising:
   (a) a portable frame, said frame consisting of a bow having a first leg and a second leg, said legs being spaced from each other; and
   a first and second guide roller support bars, the first guide roller support bar being mounted to one side of the first leg, and the second guide roller support bar being mounted to a free end of the second leg;
   (b) a first and a second guide roller assemblies each being mounted to a respective distal end of the first and second guide roller support bars, each said guide roller assembly having a pair of guide rollers;
   (c) a power source mounted on the other side of the first leg,
   (d) a drive wheel driven by the power source and spaced from the first guide roller assembly;
   (e) an idle wheel mounted to the free end of the second leg; and
   (f) an endless loop type band saw blade mounted on the wheels and driven by the drive wheel, whereby two opposed portions of the band saw blade which run through each of the guide roller assemblies being pressed against each other and guided between the respective pair of guide rollers.

* * * * *